United States Patent [19]

Gates et al.

[11] Patent Number: 4,910,659
[45] Date of Patent: Mar. 20, 1990

[54] INPUT AND OUTPUT PERIPHERAL CONTROLLER CARDS FOR USE IN A PROGRAMMABLE LOGIC CONTROLLER SYSTEM

[75] Inventors: Dirk I. Gates, Woodland Hills; Charles A. Clark, Jr., Chatsworth, both of Calif.

[73] Assignee: Square D Company, Palatine, Ill.

[21] Appl. No.: 131,994

[22] Filed: Dec. 11, 1987

[51] Int. Cl.$^4$ .............................................. G05B 19/02
[52] U.S. Cl. .................................... 364/140; 364/900; 364/926.9; 364/949
[58] Field of Search .............................. 364/140–147, 364/900 MS File, 483; 361/426

[56] References Cited

U.S. PATENT DOCUMENTS

| | | |
|---|---|---|
| 4,078,259 | 3/1978 | Soulsby et al. ........... 364/900 |
| 4,339,794 | 7/1982 | Hideshima et al. ........ 364/200 |
| 4,377,853 | 3/1983 | Dockal ...................... 364/900 |
| 4,455,621 | 6/1984 | Pelley et al. .............. 364/900 |
| 4,504,927 | 3/1985 | Callan ....................... 364/900 |
| 4,593,380 | 6/1986 | Kocher et al. ............. 364/900 |

OTHER PUBLICATIONS

Allen-Bradley Installation and Maintenance Bulletin 1774 PLC, Allen-Bradley Co. Milwaukee, Wisconsin; Aug. 1975-pp. 16 and 23.

*Primary Examiner*—Joseph Ruggiero
*Attorney, Agent, or Firm*—Eric S. Hyman

[57] ABSTRACT

The present invention is directed to a programmable logical controller (PLC) system incorporating a universal input controller card, a universal output controller card, and a symmetrical current mirror fuse blown detector circuit. The universal input controller card is capable of tracking input voltages from 12 to 240 volts, AC or DC. The universal output controller card is capable of outputting output voltages ranging from 12 to 120 volts, AC or DC with no significant leakage current and no load resistors. The current mirror fuse blown detector circuit detects blown fuses in each output channel of the output controller card.

19 Claims, 5 Drawing Sheets

INPUT AND OUTPUT PERIPHERAL CONTROLLER CARDS FOR USE IN A PROGRAMMABLE LOGIC CONTROLLER SYSTEM

BACKGROUND OF THE INVENTION

The present invention is directed to programmable logic controller (PLC) systems which control a wide variety of manufacturing processes. A typical configuration is shown in FIG. 1, and comprises a power supply 11 which supplies power to a processor 13 which is coupled to an address bus 21, a data bus 23 and control bus 25, each of which are coupled to individual controller slots 15. As shown in FIG. 1, a single processor typically accesses up to 16 controller cards, each of which is plugged into one of 16 controller slots 15. The controller cards themselves interface, for example, external apparatus such as robots on an assembly line through input cards for receiving signals from the robots and output cards for generating signals which control the operation of the robots through a feedback control loop.

SUMMARY OF THE INVENTION

The present invention is directed to a programmable logical controller (PLC) system incorporating a universal input controller card, and a universal output controller card which contains a symmetrical current mirror fuse blown detector circuit. The universal input controller card is capable of tracking input voltages from 12 to 240 volts, AC or DC. The universal output controller card is capable of outputting output voltages ranging from 12 to 120 volts, AC or DC with insignificant leakage current, with no output load resistors required. The current mirror fuse blown detector circuit can detect a blown fuse in any output channel of the output controller card.

DETAILED DESCRIPTION OF THE INVENTION

The present invention is directed to a programmable logic controller (PLC) used in factory automation systems.

Figure 1:
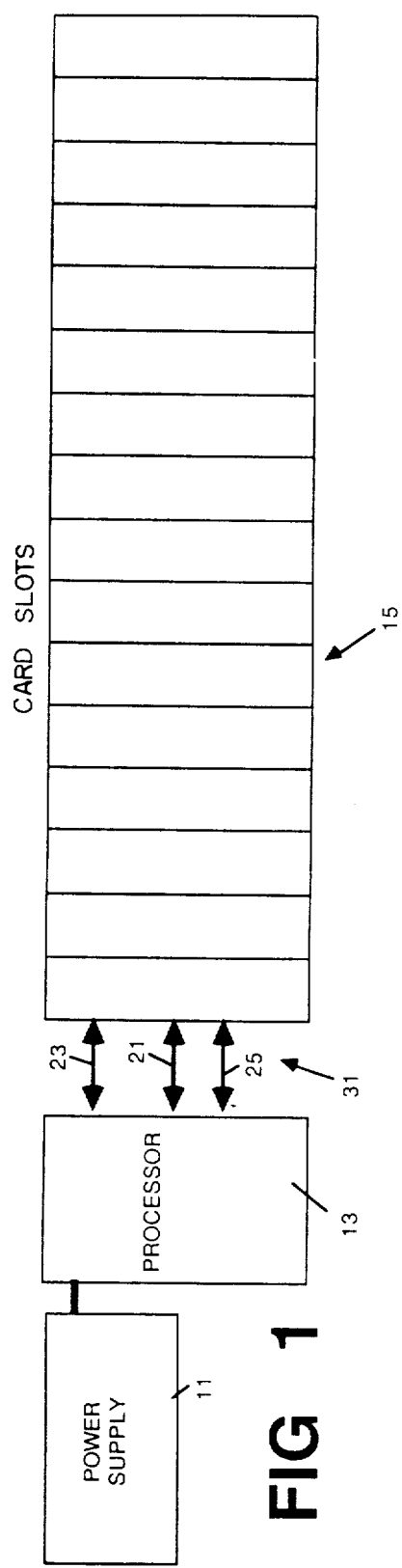
FIG. 1 is a block diagram showing the overall arrangement of the invented system.

As shown in FIG. 1, a PLC comprises a power supply 11, a processor 13, and a plurality of peripheral card slots 15 into which desired peripheral cards are inserted. In the present invention, as shown in FIG. 1, 16 slots are available for peripheral controller cards such that in any one PLC, from 1 to 16 peripheral cards may be accessed by the processor 13. Such a PLC configuration is installed in a rack which may be linked to additional racks. The back plane 31 of the rack includes a data bus 21, an address bus 23 and a control bus 25 accessible by each controller card in any one of the 16 slots.

Universal Input Card

Figure 2:
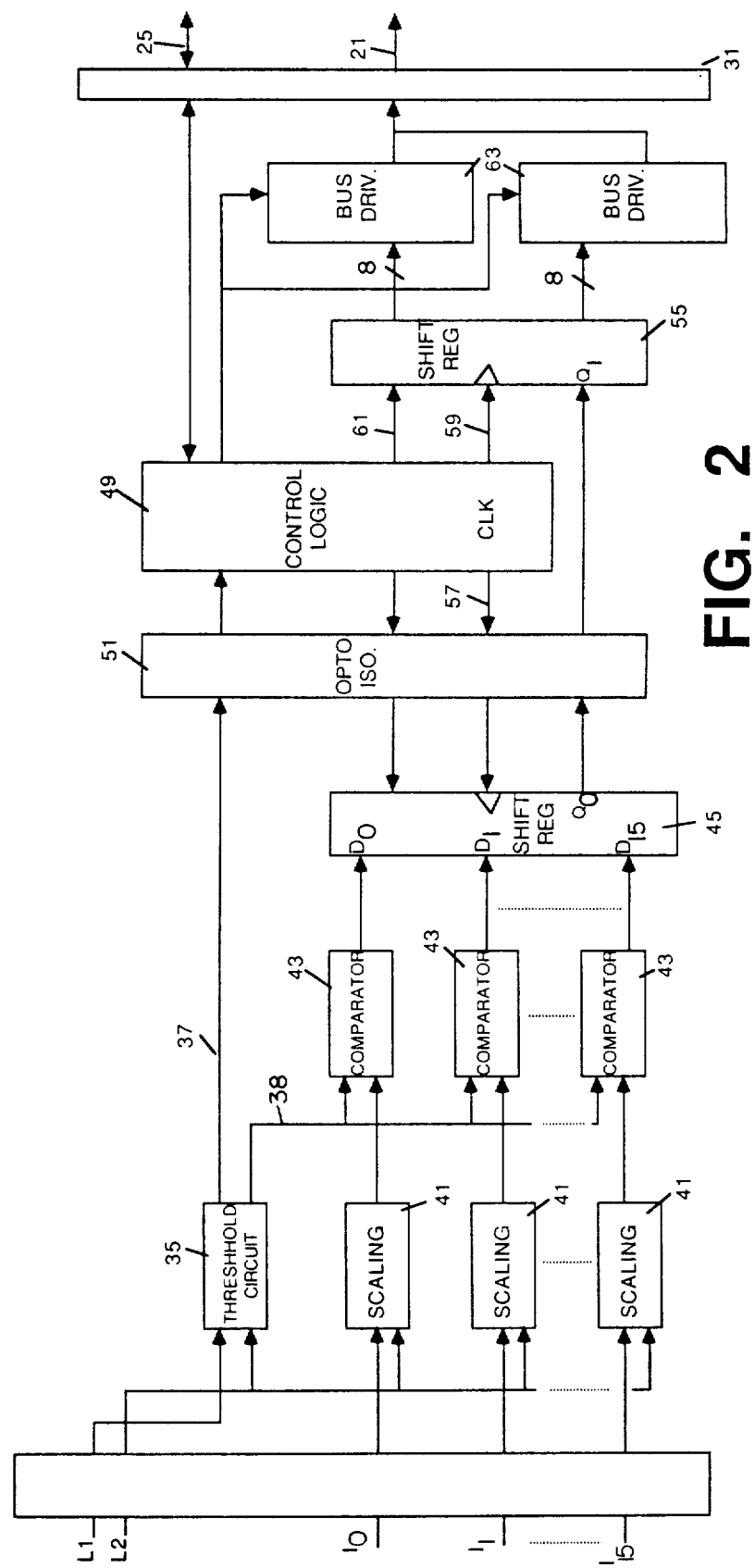
FIG. 2 is a block diagram of a universal input card according to the present invention.

Referring now to FIG. 2, a block diagram of the invented universal input card is shown.

Inputs to the card include line voltage through L1 and L2 and inputs which ranges between 0 and 240 volts, AC or DC, (referenced to L2) from an external apparatus being monitored, on lines I0–I15. These inputs, when ON, are equal to the L1-L2 voltage; when OFF, the input voltages are zero. Although FIG. 2 is shown with 16 input channels or lines, PLC input cards are frequently implemented with only 8 input channels. Of course, the invention may be practiced with additional or fewer input channels if desired.

The line voltage on L1-L2 is applied to threshold circuit 35 which generates a logic 1 on line 37 when the L1-L2 line voltage is greater than or equal to 75 percent of the peak line voltage and a voltage on line 38 which is 50 percent of the peak line voltage scaled to between 0 and 5 volts. The voltage on line 38 is referred to as the reference voltage VR. The voltages on the input channels I0–I15 are applied to scaling circuits 41 which convert an AC input voltage into a DC voltage, and scale the input voltage to a voltage between 0 and 5 volts. VR and the input voltages are scaled to between 0 and 5 volts for compatibility with the low level comparator and TTL levels.

The outputs of scaling circuits 41 comprise one input to comparators 43, the other input being VR on line 38. The comparators generate a logic output such that if the scaled voltage on an input channel, Ii, is greater than VR, the output of the comparator, Di, is true, otherwise the output, Di, is false, where i represents a particular input channel 0–15. The comparator outputs D0–D15 are stored in shift register 45 whenever a load shift register signal is generated on line 47 by control logic 49 through opto-isolator 51. Opto-isolator 51 is used to provide isolation between the low voltage levels used by processor 13 and buses 21, 23 and 25 and the high voltages used by the external devices feeding the inputs.

Thus, shift register 45 contains a bit pattern representing which of inputs I0–I15 are greater than VR (i.e., which inputs are ON) and which of inputs I0–I15 are less than or equal to VR (i.e., which inputs are OFF).

A serial output Q0 from shift register 45 is input to shift register 55 under control of control logic 49 which generates appropriate clock signals on lines 57 and 59 with a load shift register signal on line 61. Shift register 55 converts the serial data from shift register 45 Q0 output back to parallel data which is then output to bus driver circuit 63 which places the data D0–D15 on data bus 21. Once on the data bus, such data may be accessed by processor 13.

In the preferred embodiment, control logic 49 is implemented as a programmable logic array such as a Monolithic Memories PAL 16R6. The equations loaded into control logic 49 for controlling the invented universal input card form an 18 state state machine in which state 1 generates the load signal on line 47 to input shift register 45; states 2–17 generate clock (shift) signals to both input shift register 45 and output shift register 55 on lines 57 and 59 respectively; and state 18 generates the latch signal on line 61 to shift register 55. The state machine is enabled only when the sample signal on line 37 is true. When the signal on line 37 is false, the state machine is reset to state 1. The equations necessary for control logic 49 to generate the required shift register signals should be apparent to those skilled in the relevant art.

Control logic 49 also generates bus driver 63 enable signals on line 50 based on rack control input signals from control bus 25. The particular control bus signals generated depend upon the signals generated by processor 13 when performing reads of data on bus 21. The logic necessary to generate the bus driver enable signals could have been implemented as discrete components using buffers, latches and delay circuitry using well known bus interfacing techniques. However, in the preferred embodiment, the programmable logic array has sufficient capacity to generate the bus driver enable signals as well as the shift register control signals.

In an alternate embodiment, instead of control logic 49, shift register 45 and 55 and 4 line opto isolator 51, a 16 line opto-isolator could be used to transfer the outputs from comparators 43 stored in 16 peak-hold circuits for input to bus control logic implemented with discrete components. However, a 16 line opto-isolator is substantially more costly than a 4 line opto-isolator with a programmable logic array and shift registers.

The various components of the universal input card are readily available components. Specifically, each of the comparators 43 may be implemented as a National Semiconductor LM339. Shift register 45, which functions as a 16 bit latch and parallel to serial shift register may be implemented as a Texas Instruments 74HCT165. Opto-isolator 51 is a Hewlett Packard HCPL-2631. Shift register 55, which is a 16 bit serial to parallel shift register and latch is a Texas Instruments 74HCT4094 and bus drivers 57 are Texas Instruments 74ALS244. The details of threshold circuit 35 and scaling circuits 41 should be apparent to those skilled in the relevant art.

In the present invention, by providing reference voltage VR, whose level is determined by the L1-L2 voltage, a single input card may be used for a wide variety of input voltage levels. In the prior art, a fixed reference voltage is provided. Therefore, in order to provide the capability for a PLC to handle a range of input voltages, separate input cards for each different voltage must be utilized. Generally, a plant needs to maintain a large inventory of prior art input cards to ensure a supply of sufficient cards for all applications. However, with the invented universal input card, instead of maintaining, for example, 10 cards for each of 10 input voltages, i.e. 100 cards, the plant inventory might consist of 50 universal input cards according to the present invention.

Universal Output Card

Figures 3, 4:
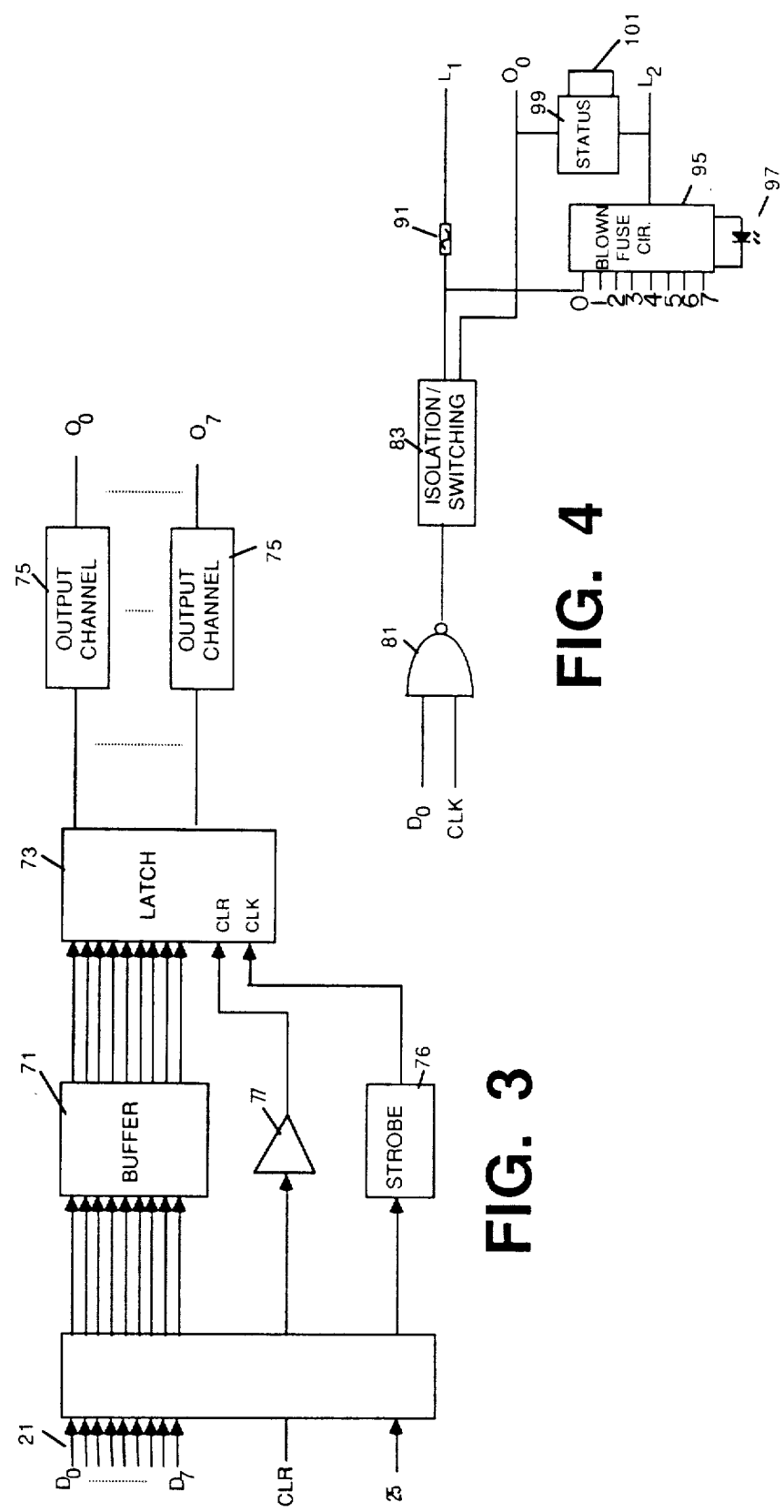
FIG. 3 is a block diagram of a universal output card according to the present invention.
FIG. 4 is a block diagram showing the details of a single output channel for a universal output controller card.

Referring now to FIG. 3, a block diagram is shown for a universal output card with 8 output channels O0-O7 which may range from 12-240 volts, AC or DC. More or fewer channels may be implemented without departing from the scope of the invention.

As shown in FIG. 3, a universal output controller according to the present invention converts digital signals D0-D7 on data bus 21 to an output voltage on lines O0-O7, which, as noted above, is a voltage ranging from 12-120 volts, AC or DC. The data on bus 21 is laded in buffer 71 and then stored in latch 73. The latched data is input to one of eight identical output channels 75 which generate output signals O0-O7. Buffer 71 and latch 73 are implemented utilizing well known bus interface logic techniques. For example, buffer 71 may be a Texas Instruments part 74HCT240 and latch 73 may be a Texas Instruments part 74HCT273. The data or D0-D7 is stored into latch 73 based upon a signal from strobe signal generator 76 which generates a signal to the clock input of latch 73 when the processor 13 performs a write, as determined by signals on control bus 25, to the slot in which the output card is located. The details of generator 76 depends upon the manner in which the processor causes writes of data on bus 21 to occur. However, such details will be apparent to persons of ordinary skill in the relevant art.

Further details regarding each of the output channel 75 will no be described with reference to FIG. 4 which illustrates output channel 0 generating an output O0 based upon an input D0 in latch 73. Outputs D1-D7 each have an identical output channel 75 for generating outputs O1-O7. The data D0 is one input to NAND gate 81, the other input to which is a 1 MHz clock. The output of NAND gate 81 is coupled to isolation circuitry 83, further details of which will be described with reference to FIG. 5. However, isolation circuitry 83 is implemented as a transformer coupled converter wherein a high frequency pulse transformer is used to provide voltage isolation of 2500 VRMS. The output of the transformer is rectified and used as the gate voltage for power FETs connected with their sources common. The result is an isolation power switch capable of switching AC or DC.

Switching is performed by FET switch 110 (see FIG. 5) which, in the preferred embodiment, is capable of driving loads as large as an ASEA relay switch, size 6, with a 120V coil, 60 Hz. Of course, by using FETs with a higher voltage rating, higher voltages could be handled by the invented output card. FETs 110a and 110b are in parallel (as are FETs 110c and 110d) to double the current carrying capacity of the FET switch. FETs 110a and 110c are connected in opposition to prevent current from flowing through the FET body diodes 111a-111d when the FET switch is OFF. By adding more paralleled FETs, higher currents could be handled. To protect the output channel, each output channel 75 has a fuse 91 which is placed on L1. In the preferred embodiment, a blown fuse circuit 95 (described hereinbelow) is used to detect a blown fuse on any of the output channels O0-O7 by activating an LED indicator 97. Additionally, a status circuit 99 is coupled to the output O0 to provide an indication by LED 101 when output channel 0 is enabled by FET switch 110. Similarly, each of the outputs O1-O7 is input to respective status circuits 99, each of which drives an LED 101. The details of an appropriate status circuit 99 should be apparent to those skilled n the art and, therefore, will not be discussed herein.

Figure 5:
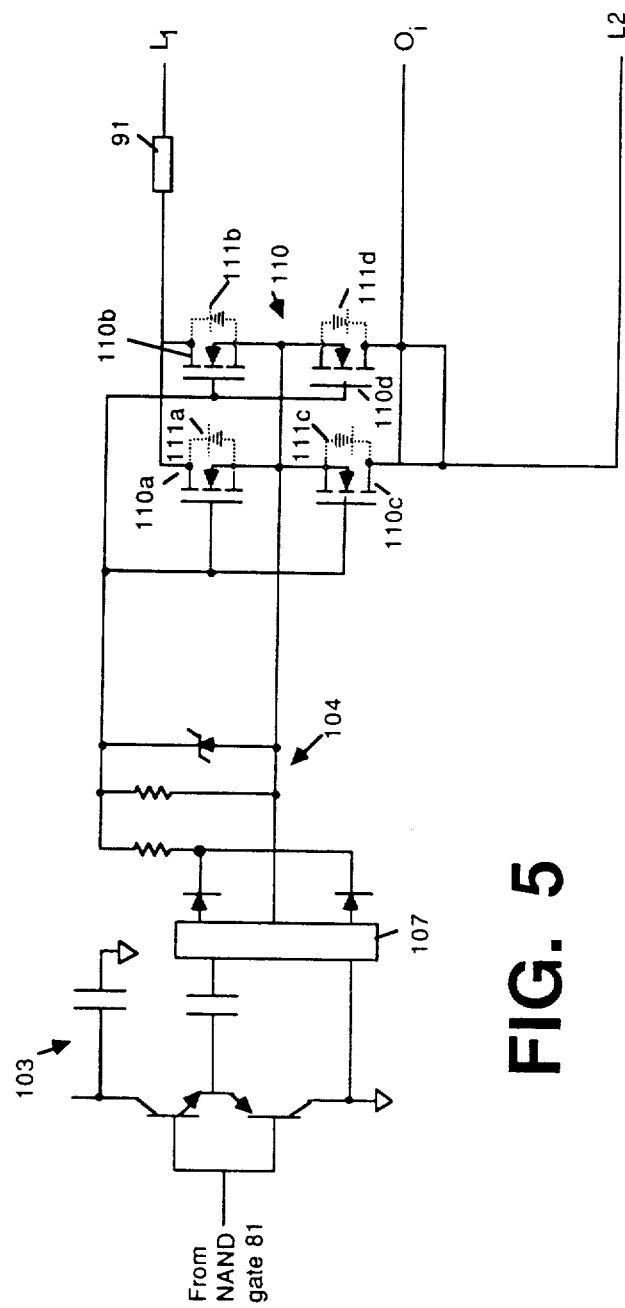
FIG. 5 is a schematic diagram showing the isolation circuit and switching circuit used by the universal output card.

Referring now to FIG. 5, the details of isolation and switching circuit 8 and will be described.

NAND gate 81 output is applied to transistor/capacitor circuit 10 which converts the NAND gate TTL low current output to a high current AC coupled to the primary side of transformer 107.

Step-up transformer 107 provides isolation between the digital PLC and the external apparatus being controlled by the outputs O0-O7. The voltage created on the secondary side of transformer 107 is rectified and limited by resistor/zener diode/diode circuit 104 such that the voltage can be used to control the states of FETs 110a-110d which form an FET switch 110. In this connection, each output channel 75 has an FET switch 110 which, in the preferred embodiment, comprises two pairs of power FETs, i.e. EETs 110a and 110b and FETs 110c and 110d. Each FET switch 110 switches the line voltage L1-L2 on or off for its respective output O0-O7. In this manner, TTL level signals, D0-D7, from data bus 21 are isolated by transformer 107 from switched outputs O0-O7 which they control. Outputs O0-O7 range from 12 to 120 volts (or higher if power FETs of sufficient voltage rating are used), AC or DC, depending on the voltage placed on L1-L2. By the use of FET switch 110, the switched output voltage is obtained without significant leakage and without the need for load resistors. Prior art output cards use fixed voltage switching mechanisms such that a separate output card is required for each voltage being controlled. In an alternate embodiment, a FET switch comprising a single pair of power FETs (such as 110a and 110c) may be used wit a reduction in current handling capability.

Thus, as was the case with the invented input cards, by use of the invented output cards, which operate over a range of voltages, a plant need not maintain an inventory for each different voltage which needs to be controlled by the PLC.

Blown Fuse Circuit

Figure 6:
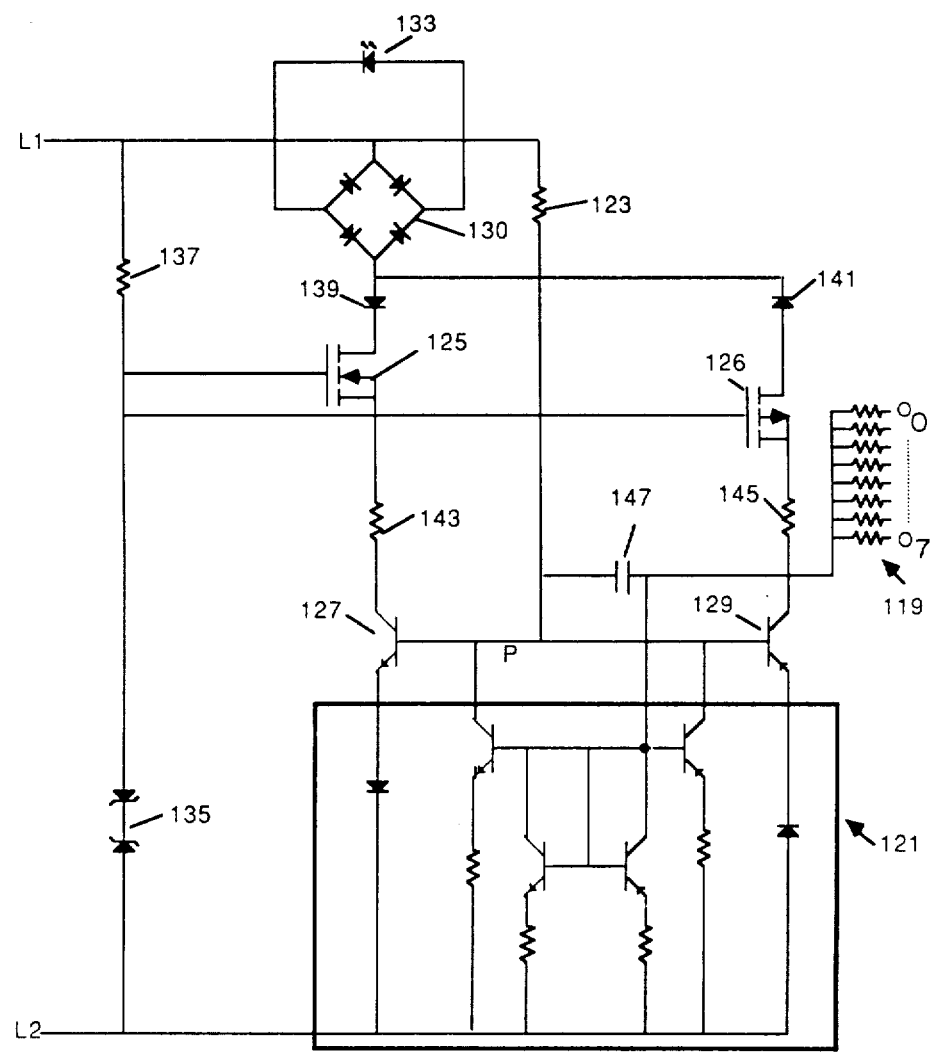
FIG. 6 is a schematic diagram showing the blown fuse detector circuit used by the universal output card.

Referring now to FIG. 6, in the invented output card, a blown fuse circuit 95 may be utilized to detect when a fuse 91 has blown in one or more of the output channels described with reference to FIGS. 4 and 5. Specifically, when blown fuse circuit 95 is utilized, each of the eight output channels O0-O7 between FET switch 110 and use 91, is coupled to one of eight equal valued resistors 119. The other sides of the resistors are tied together to form a sum of the currents of the output channels, which is input to a current mirror 121. In this manner, for each of the fuses 91 which clears, a 12½ percent drop in the current into the current mirror occurs. The other side of current 121 mirror is a current fed through a resistor 123 which is about ⅛th the resistance of resistors 119. Of course, if there are less than or greater than eight output channels, resistor 123 would be 1/(the number of output channels) of resistor 119. The othe end of resistor 123 is coupled to L1 to thereby create a reference current for current mirror 121.

If the sum of the currents on the 8 channels O0-O7 is less than the reference current, which will only happen if the fuse 91 on one or more of the channels has blown, power FET 125 or 126 is turned on, depending on the polarity of L1 and L2.

If it is determined that a fuse has blown (by a current drop of 12½% or more) the difference between the reference current and sum of currents through resistors 119 as determined by the current mirror is amplified by transistor 127 or 129 depending upon the polarity of the voltage on L1-L2. The amplified current flows through power FETs 125 and 126 which are used to drop the voltage to safe levels for the transistors in the current mirror 121 and transistors 127 and 129. If the source current of FET 125 or 126 is being controlled, then the FET effectively produces a voltage drop. If an imbalance occurs by one or more fuse being blown, current is allowed to flow in the FETs and through diode bridge 130, in the line common to the two drains of FETs 125 and 126, causing LED indicator 133 to light.

Zener diodes, 135 coupled between L2 and resistor 137, limit the gate-to-source voltage at FETs 125, 126. Resistor 137 coupled between L1 and zener diodes 135, provides the limited amount of current needed for operation of zener diodes 135. Together, zener diodes 135 and resistor 137 provide sufficient gate potential for operation of FETs 125 and 126.

Diodes 139 and 141 coupled between diode bridge 130 and FETs 125 and 126 block undesired conduction of the intrinsic (body) diodes present within FETs 125 and 126.

Resistors 143 and 145 coupled between FETs 125 and 126 and transistors 127 and 129, limit the maximum amount of current which may flow through FETs 125 and 126, and thus through LED 133. Such protection is needed, for example, in the event all of the fuses 91 blow.

Capacitor 147 coupled between resistors 119 and resistor 123 removes any high frequency noise from the input to the current mirror 12 to prevent false indications.

Alternatively, instead of LED 133 alone, a photocoupler could be placed in series with the LED to create a logic level isolated indication that a fuse 91 had blown.

We claim:

1. In a programmable logic controller system including a processor for coupling to peripheral controller cards through a data bus and a control bus, wherein said peripheral controller cards include an input card for receiving inputs from external apparatus utilizing a line voltage having a peak value and having a voltage range between approximately 12 and 240 volts, AC or DC, said input card for generating logic level signals for use by said processor, the improvement wherein said input card comprises:
   means for generating a reference voltage from said line voltage, said reference voltage being a percentage of the peak value of said line voltage;
   means for comparing each of said inputs with said reference voltage and generating a logic true when a corresponding one of said inputs is greater than said reference voltage and a logic false when said corresponding one of said inputs is less than or equal to said reference voltage;
   means for scaling said reference voltage and said inputs to logic level voltages.

2. The improvement defined by claim 1 wherein said reference voltage generated is 50 percent of said peak value.

3. The improvement defined by claim 1 further comprising means for providing isolation between the voltage of said inputs and the voltages on said data bus and said control bus.

4. The improvement defined by claim 3 wherein said isolation means comprises an opto-isolator for each of said inputs.

5. The improvement defined by claim 3 wherein said isolation means comprises:
   a four line opto-isolator coupled to a first shift register means for storing the outputs of said comparator means in parallel and shifting said stored output serially through one line of said four line opto-isolator to a second shift register means for storing said shifted data in parallel; and
   control logic means coupled to said four line optoisolator and said second shift register for generating load shift register and clocking signals to said first and second shift register means.

6. In a programmable logic controller system including a processor for coupling to peripheral controller cards through a data bus and a control bus, wherein said peripheral controller cards include an output card for supplying outputs to external apparatus utilizing a line voltage, said outputs being controlled by logic level signals from said processor, the improvement wherein said output card comprises switching circuit means for switching said line voltage on and off based upon said logic level signals wherein said switching circuit means operates over a voltage range of at least 12 to 120 volts, AC or DC.

7. The improvement defined by claim 6 further comprising means coupled between said data bus and said switching means for providing voltage isolation between said data bus and said switching means.

8. The improvement defined by claim 7 wherein said isolation means comprises for each line on said data bus:
   a transformer coupled on its primary side to one line of said data bus and coupled on its secondary side to said switching circuit means;
   means for alternating the direction of the signal on said line from said data bus to provide an alternating current through the primary side of said transformer to generate a current on the secondary side of said transformer; and
   means for amplifying the current on said secondary side to drive said switching circuit means.

9. The improvement defined by claim 6 wherein said switching circuit means comprises an FET switch which causes said line voltage to flow when said logic level corresponding to said output is true and causes said line voltage to stop flowing when said logic level corresponding to said output is false.

10. The improvement defined by claim 9 wherein said FET switch comprises a pair of power FETs coupled together serially.

11. The improvement defined by claim 9 wherein said FET switch comprises at least two pairs of power FETs, each pair being coupled together serially and said pairs being coupled together in parallel.

12. The improvement defined by claim 6 further comprising:
   a fuse coupled between said line voltage and each of said switching circuit means; and
   blown fuse detection means coupled to each of said fuses and said line voltage for detecting when at least one of said fuses has blown.

13. The improvement defined by claim 12 wherein said blown fuse detection circuit means comprises:
   a current mirror whose first input is coupled to each of said outputs through substantially equal valued resistors and whose second input is coupled to said line voltage through a resistance whose value is substantially equal to 1 divided by the number of said substantially equal valued resistors, and whose output is coupled to means for amplifying the difference between the currents of said two inputs, said amplified difference being coupled to first and second power FETs, said first and second power FETs being coupled to means for providing an indication that at least one of said fuses has blown, said first power FET for allowing current to flow when said line voltage has a first polarity and said second power FET for allowing current to flow when said line voltage has a second polarity 14. The improvement defined by claim 13 wherein said indication means comprises a diode bridge coupled to the drains of said first and second power FETs and a light emitting diode coupled across said diode bridge.

15. The improvement defined by claim 7 wherein said switching circuit means comprises an FET switch which causes said line voltage to flow when said logic level corresponding to said output is true and causes said line voltage to stop flowing when said logic level corresponding to said output is false.

16. The improvement defined by claim 8 wherein said switching circuit means comprises an FET switch which causes said line voltage to flow when said logic level corresponding to said output is true and causes said line voltage to stop flowing when said logic level corresponding to said output is false.

17. The improvement defined by claim 7 further comprising:
   a fuse coupled between said line voltage and each of said switching circuit means; and
   blown fuse detector means coupled to each of said fuses and said line voltage for detecting when at least one of said fuses has blown.

18. The improvement defined by claim 8 further comprising:
   a fuse coupled between said line voltage and each of said switching circuit means; and
   blown fuse detector means coupled to each of said fuses and said line voltage for detecting when at least one of said fuses has blown.

19. The improvement defined by claim 9 further comprising:
   a fuse coupled between said line voltage and each of said switching circuit means; and
   blown fuse detector means coupled to each of said fuses and said line voltage for detecting when at least one of said fuses has blown.

* * * * *